United States Patent [19]

Chou

[11] Patent Number: 5,374,806

[45] Date of Patent: Dec. 20, 1994

[54] PEN BASE ELECTRIC HEAT SEALER

[76] Inventor: Shu-Hui Chou, 4 Fl., No. 276, Sec. 1, Tai Tung Rd., Hsi Chih Chen, Taipei Hsien, Taiwan, Prov. of China

[21] Appl. No.: 80,762

[22] Filed: Jun. 24, 1993

[51] Int. Cl.⁵ .......................... H05B 1/00; H05B 3/42
[52] U.S. Cl. ................................ 219/229; 219/227; 219/233
[58] Field of Search ............... 219/221, 227, 229, 233, 219/236–240; 156/579; 401/1, 2, 208, 209; 606/28–31; 607/145, 146

[56] References Cited

U.S. PATENT DOCUMENTS

| Re. 8,282 | 6/1878 | Eaton | 219/233 X |
|---|---|---|---|
| 1,455,842 | 5/1923 | Kelly | 219/240 |
| 1,656,690 | 1/1928 | Blackburn | 219/240 |
| 1,744,720 | 1/1930 | Blackburn | 219/240 |
| 1,850,280 | 3/1932 | Haynes | 210/227 |
| 2,030,285 | 2/1936 | Dinyer | 219/239 |
| 2,173,380 | 9/1939 | Tharp | 219/240 X |
| 2,476,612 | 7/1949 | Lobdell | 219/240 |
| 2,598,900 | 6/1952 | Frye | 219/237 |
| 3,234,356 | 2/1966 | Babb | 219/240 X |
| 4,176,273 | 11/1979 | Fujie et al. | 219/229 X |

FOREIGN PATENT DOCUMENTS 174205 3/1935 Switzerland .......... 219/227

*Primary Examiner*—Bruce A. Reynolds
*Assistant Examiner*—John A. Jeffery
*Attorney, Agent, or Firm*—Spensley Horn Jubas & Lubitz

[57] ABSTRACT

An electric heat sealer comprises a pen-shaped housing including a power supply unit and an end portion, preferably in the form of a tapered socket, containing an electric heat seal unit. The heat seal unit includes a heat sealing tip projecting from an opening in the end portion of the housing. The heat seal unit is movable axially within the housing end portion and includes an electric contact connected to the electric heating element and arranged to engage an electric terminal on the housing to complete an electrical circuit between the power supply unit and the electric heating element. A spring disposed between the one end of the housing and the heat seal unit axially biases the heat seal unit toward the opening in the end portion of the housing sufficiently to separate the contact on the heat seal unit from the terminal on the housing. Axially directed pressure on the heat seal unit tip causes sufficient axial movement against the bias of the spring to cause the contact to engage the terminal to complete the circuit between the power supply unit and the electric heating element. Release of the pressure on the projecting tip causes movement of the heat seal unit under the urging of the spring thereby causing disengagement of the contact and the terminal so as to break the electric circuit.

6 Claims, 7 Drawing Sheets

52-ELECTRIC HEATING ELEMENT

PEN BASE ELECTRIC HEAT SEALER

BACKGROUND OF THE INVENTION

The present invention relates to a heat sealer, and more particularly to a pen base electric heat sealer for sealing polyethylene bags, etc. by heat.

A variety of electric heat sealing apparatus have been disclosed for industrial and home uses, and have appeared on the market. Among these electric heat sealing apparatus, stapler type electric heat sealing apparatus are most popularly accepted by consumers. A stapler type electric heat sealing apparatus, exemplars of which are shown in U.S. Pat. No. 5,142,123 and Japanese Patent No. 63-57206, is generally comprised of a housing made in the form of a stapler. Because much storage space is needed, a stapler type electric heat sealing apparatus is not convenient for carrying with oneself as one of personal accessories. Another drawback of stapler type electric heat sealing apparatus is that the heating action must be employed twice when sealing the open side of a polyethylene bag. As illustrated in prior art FIG. 9, when sealing the open side of a polyethylene bag 10 with a stapler type electric heat sealing apparatus 12, one end of the open side of the polyethylene bag is held in one hand as the other hand is holding the electric heat sealing apparatus to seal the bag. Therefore, the corner area of the open side of the polyethylene bag must be sealed later.

SUMMARY OF THE INVENTION

The present invention eliminates the aforesaid drawbacks. It is one object of the present invention to provide a pen base electric heat sealer which is as easy to use as a pen. It is another object of the present invention to provide a pen base electric heat sealer which is as easy to carry as a pen. It is still another object of the present invention to provide a pen base electric heat sealer which is automatically turned on to produce heat for sealing as it is pressed on the workpiece to be sealed, or turned off to stop from producing heat as it is released from the workpiece. The present invention uses a coil spring to separate the electric heating unit from the DC power supply unit. As the front end of the electric heating unit is pressed on the workpiece to compress the coil spring, the electric contacts on the electric heating unit become electrically connected to the two opposite contacts of the DC power supply unit, and therefore the electric heating unit is turned on. As the electric heating unit is released from the workpiece, the coil spring immediately pushes the contacts of the electric heating unit away from the contacts of the DC power supply unit. The cylindrical housing of the pen base electric heat sealer is attached with a cap having a clip convenient for hanging on the pocket.

DETAILED DESCRIPTION OF THE PREFERRED EMBODIMENT

Figure 1:
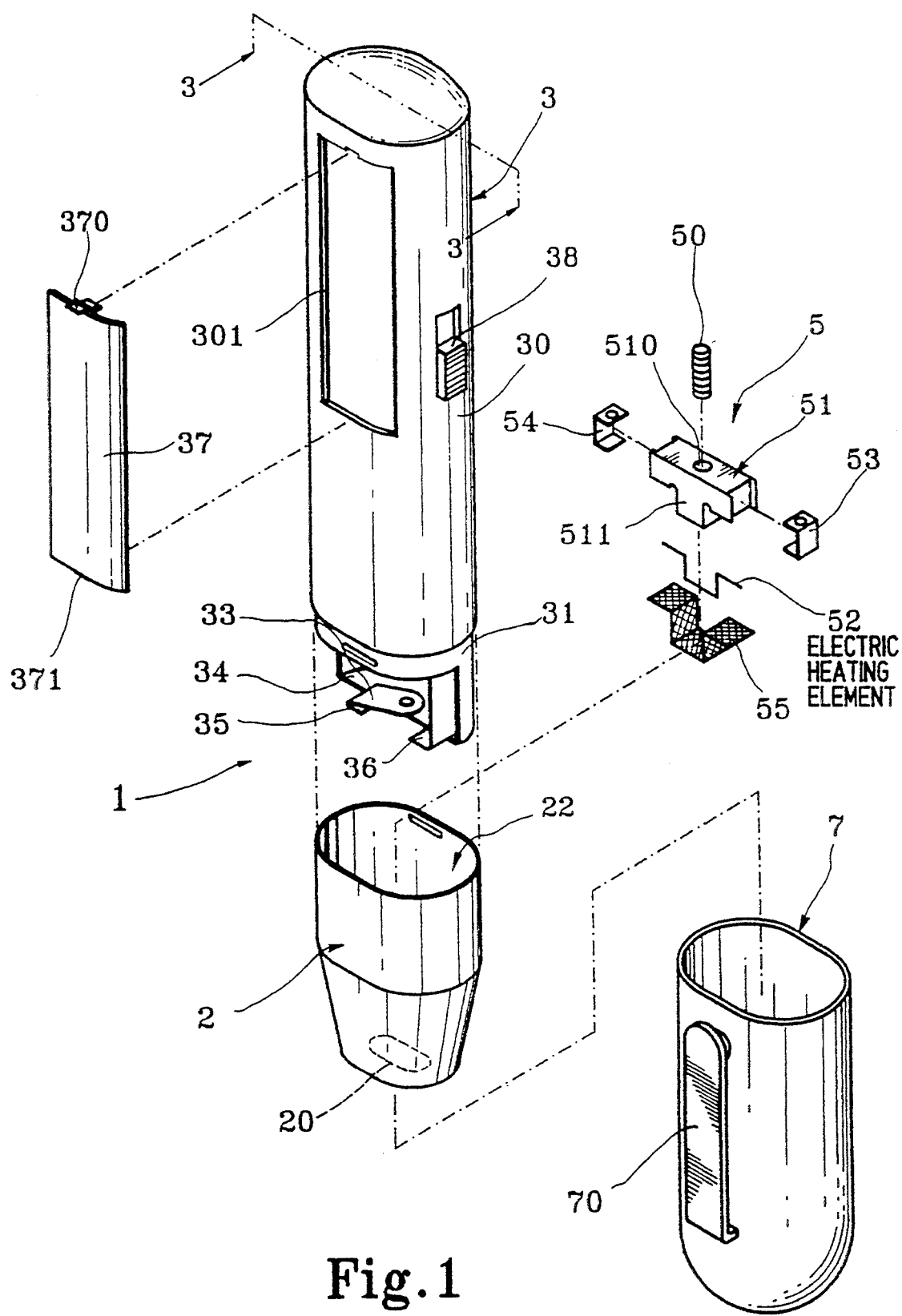
FIG. 1 is an exploded view of a pen base electric heat sealer according to the preferred embodiment of the present invention.
Figure 2:
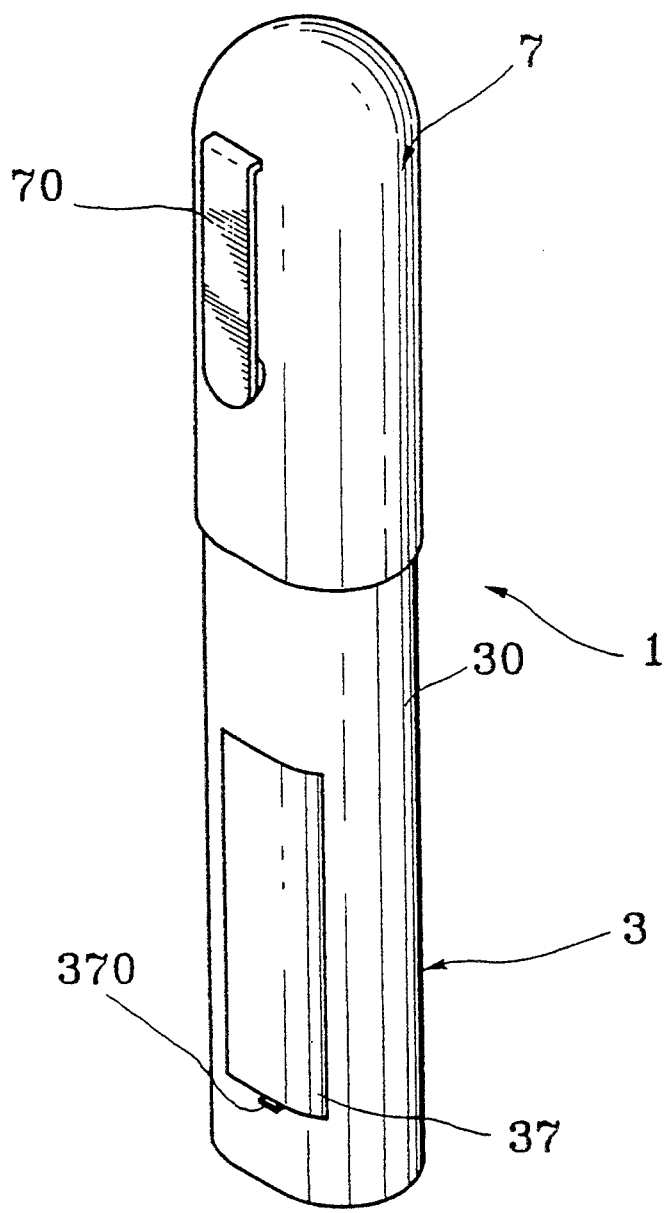
FIG. 2 is an elevational view of the pen base electric heat sealer.
Figure 3:
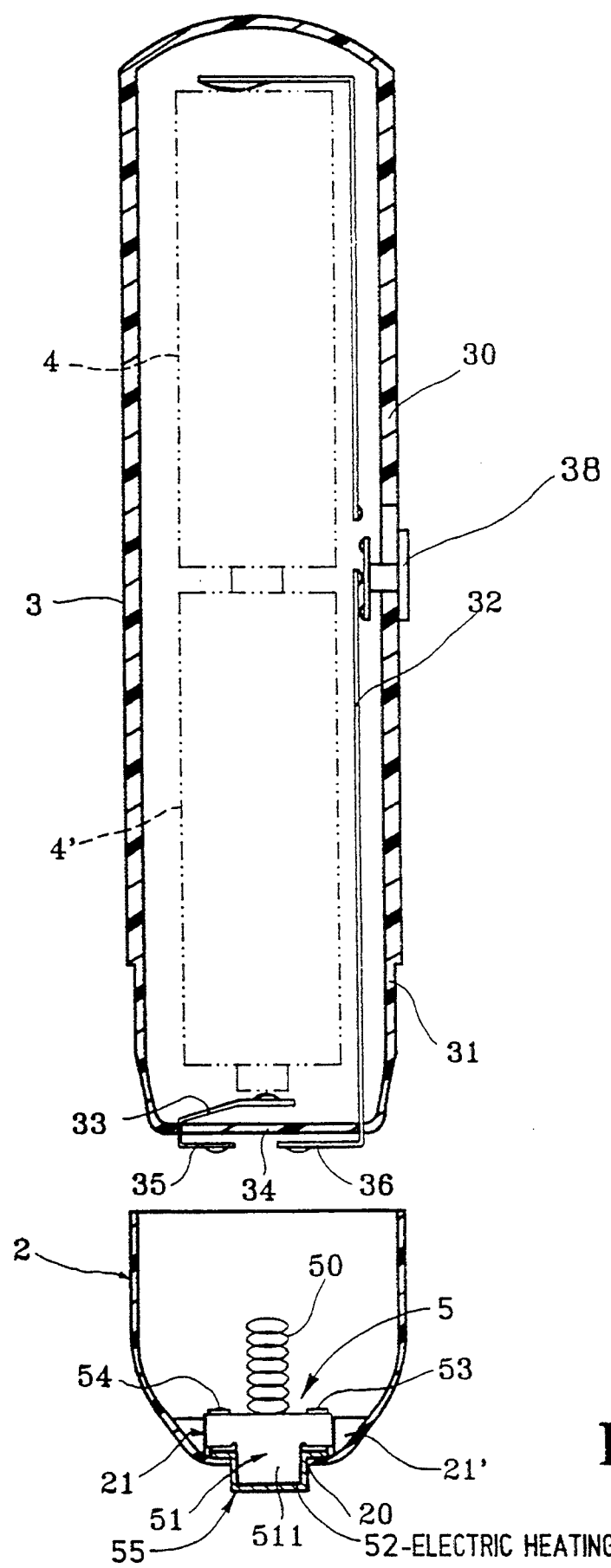
FIG. 3 is a longitudinal sectional view of the pen base electric heat sealer.

Referring first to FIGS. 1, 2 and 3, a pen base electric heat sealer in accordance with the preferred embodiment of the present invention is generally comprised of a non-metalic cylindrical housing 1 made in the shape of a pen convenient for the holding of the hand. The cylindrical housing 1 is comprised of a power supply unit 3 and an electric heat seal unit 5 longitudinally connected to the power supply unit 3 at one end. The power supply unit 3 comprises a cylindrical battery chamber 30, which receives two dry battery cells 4;4' connected in series (see FIG. 3), and a cylindrical connecting neck 31 in a relatively smaller outer diameter extended from the battery chamber 30 at one end for connecting the electric heat seal unit 5 in a flush manner.

The battery chamber 30 has an opening 301 for loading the dry battery cells 4;4', and a battery lid 37 detachably covered on the opening 301. The battery lid 37 has two retainers 370;371 on two opposite ends thereof for mounting on the opening 301.

The power supply unit 3 comprises two metal contact plates 32;33, each having one end connected to either pole of the dry battery cells 4;4' and an opposite end extended out of the bottom wall 34 of the battery chamber 30 and terminated to a respective contact 36 or 35. One metal contact plate 32 is connected in series to a power switch 38 for On/Off switching control. The bottom wall 34 of the battery chamber 30 is a division wall between the battery chamber 30 and the heat seal unit 5.

The electric heat seal unit 5 is received in a socket 2. The socket 2 has a top open end 22 in a relatively bigger diameter, into which the connecting neck 31 fits, and and a bottom open end in a relatively smaller diameter terminated to a small opening 20. The electric heat seal unit 5 comprises a non-metallic base 51 having a top center hole 510 and a bottom projecting block 511, a coil spring 50 having one end inserted in the hole 510 on the base 51 and an opposite end stopped against the bottom wall 34 of the battery chamber 30 (see also FIG. 4), two metal clamps 53;54 bilaterally fastened to the base 51 at the top, an electric heating wire 52 fastened between the metal clamps 53;54 and attached to the bottom edge of the bottom projecting block 511 being disposed 15 out of the socket 2 through the opening 20, a protective layer of heat-resisting fibers 55 covered over the electric heating wire 52 for protection.

Figure 4:
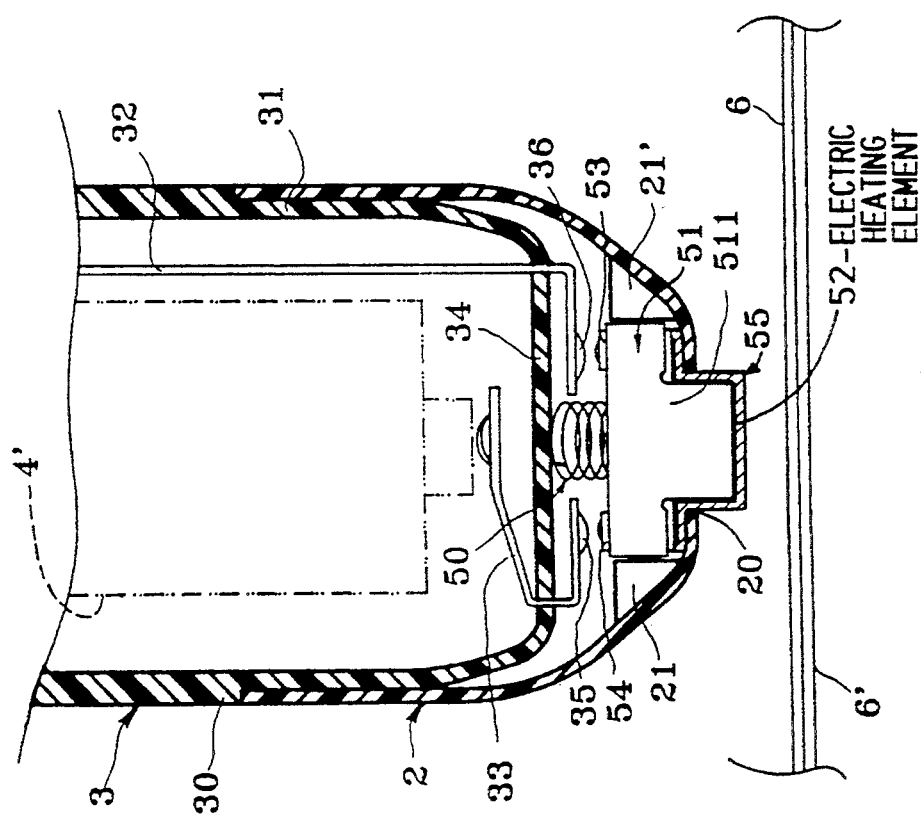
FIG. 4 is a partial sectional view of the pen base electric heat sealer showing the metal clamps of the electric heat seal unit disconnected from the contacts of the metal contact plates.

Referring to FIG. 4, the electric heat seal unit unit 5 is retained inside the socket 2 between two stop blocks 21;21' with the coil spring 50 stopped against the bottom wall 34 of the battery chamber 30, and the metal clamps 53;54 are respectively spaced below the contacts 36;35. The stop blocks 21;21' are provided to guide the linear movement of the electric heat seal unit 5 along the longitudinal axis of the housing 1.

Figure 5:
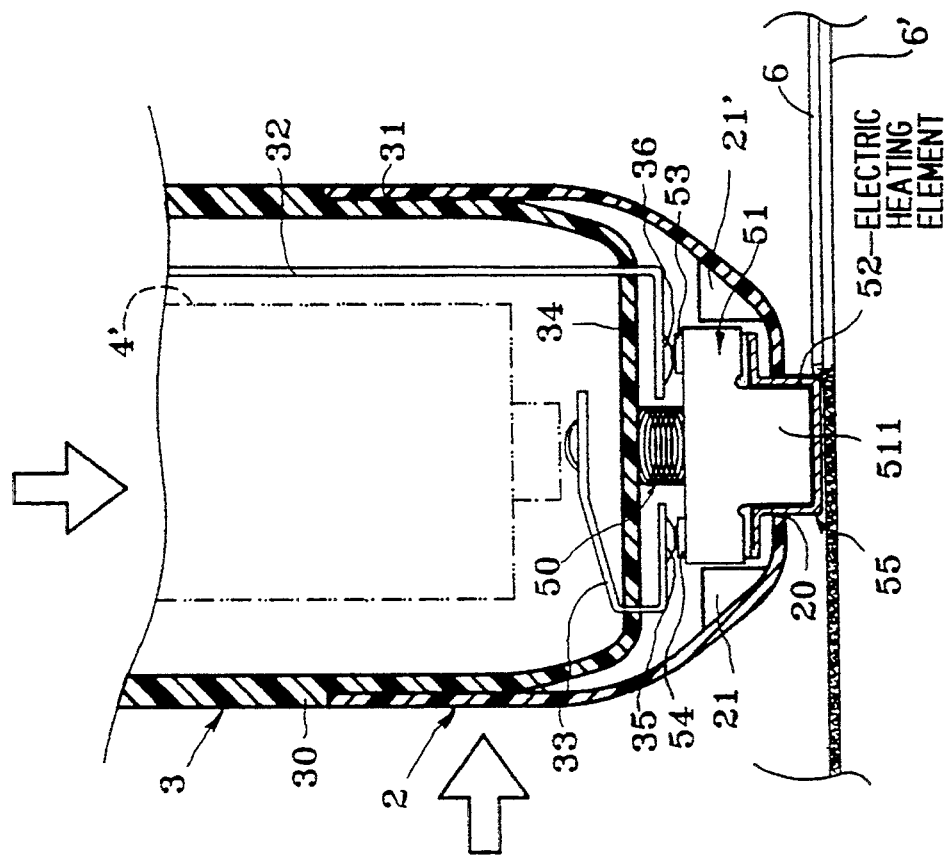
FIG. 5 is similar to FIG. 4 but showing the metal clamps electrically connected to the contacts of the metal contact plates.

Referring to FIG. 5, as the switch 38 is switched on and the electric heat seal unit 5 is pressed on the plastic films 6;6' to be sealed, the metal clamps 53;54 become respectively connected to the contacts 36;35 to electrically connect the electric circuit, and therefore the electric heating wire 52 is heated to give heat through the protective layer of heat resisting fibers 55 for sealing the plastic films 6;6'. As soon as the electric heat seal unit 5 is removed from the plastic films 6;6', the coil spring 50 immediately pushes the base 51 outwards, and therefore the metal clamps 53;54 are separated from the contacts 36;35 to disconnect the electric circuit. Therefore, the pen base electric heat sealer is as easy to use as a pen.

Figure 6:
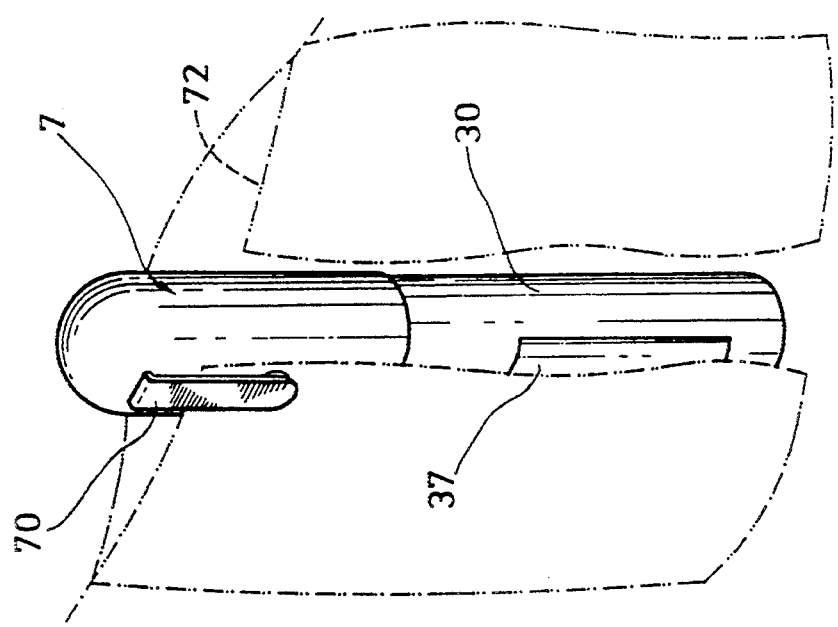
FIG. 6 is a schematic drawing showing the pen base electric heat sealing fastened to the pocket by the clip on the cap thereof.

Referring to FIG. 6 and FIG. 1 again, there is provided a cap 7 with a clip 70 for covering the socket 2 and the electric heat seal unit 5 as the pen base electric heat sealer is not in use. By means of the clip 70, the pen base electric heat sealer can be fastened to a pocket 72.

Figure 7:
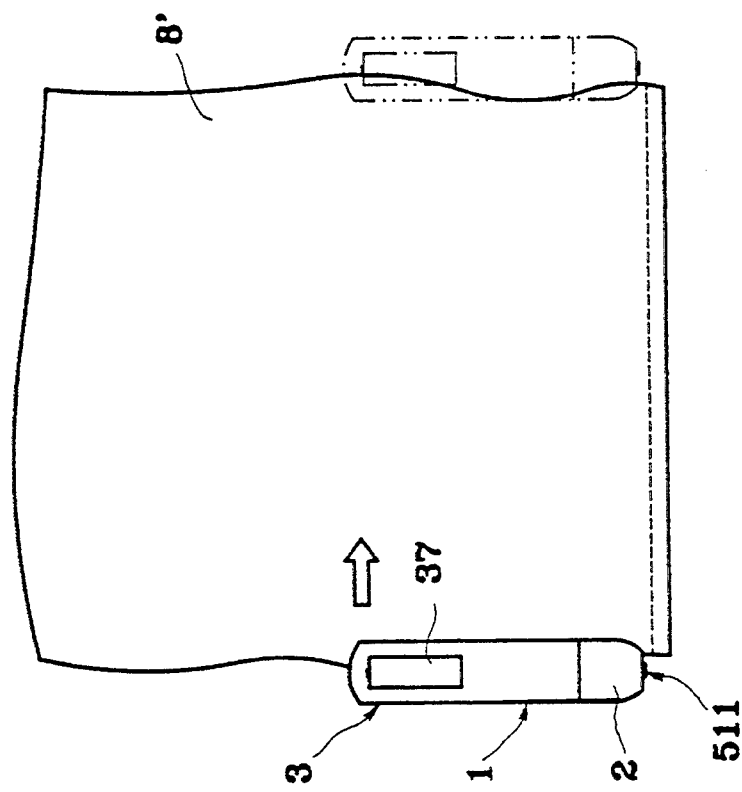
FIG. 7 is a schematic drawing showing the operation of the present invention in sealing the open side of a polyethylene bag through one stroke.

Referring to FIG. 7, as the pen base electric heat sealer is as easy to use as a pen, sealing the open side of a polyethylene bag can be done in one stroke.

Figure 8:
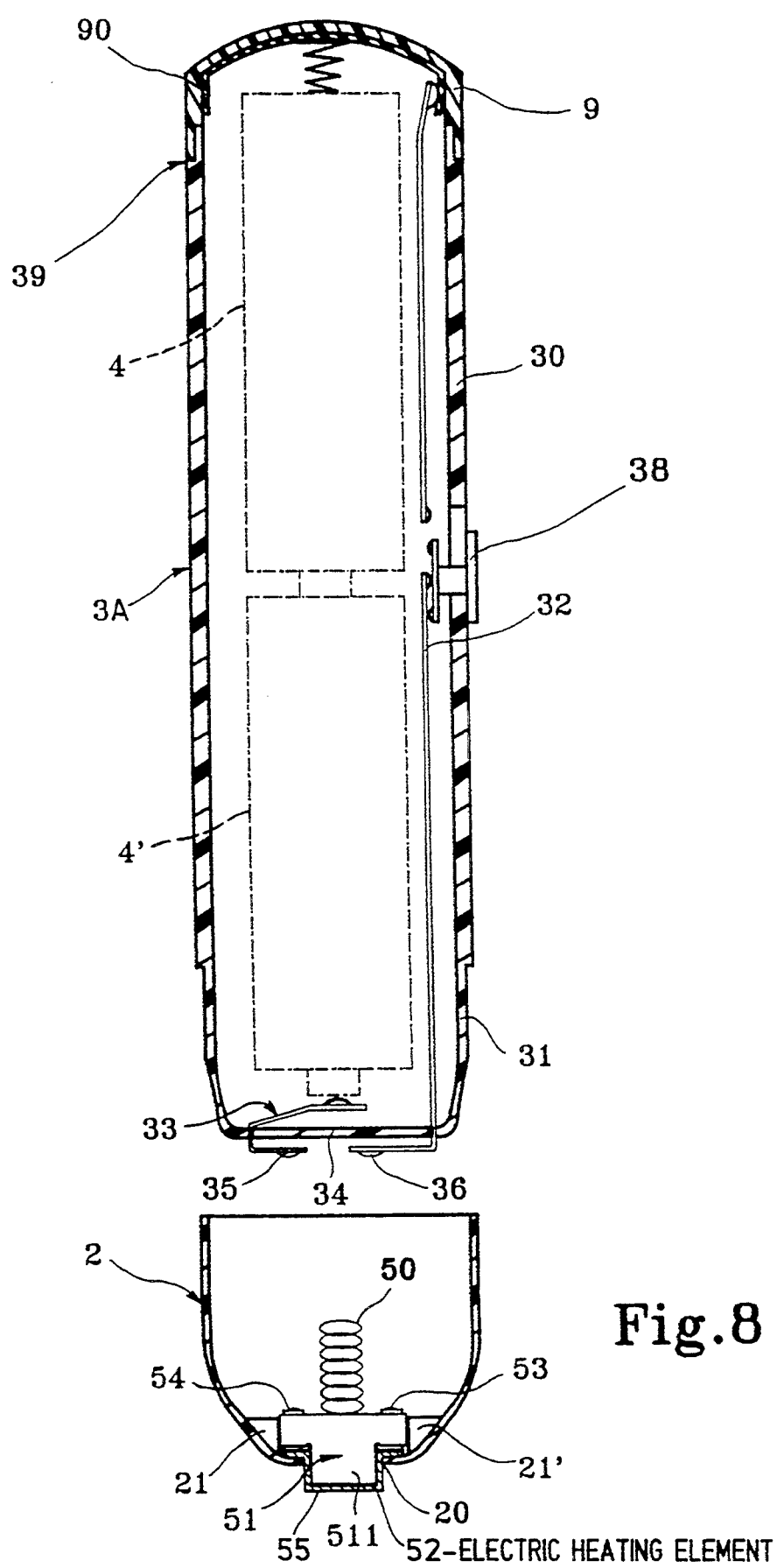
FIG. 8 is a longitudinal secitonal view of an alternate form of the housing of the pen base electric heat sealer according to the present invention.
Figure 9:
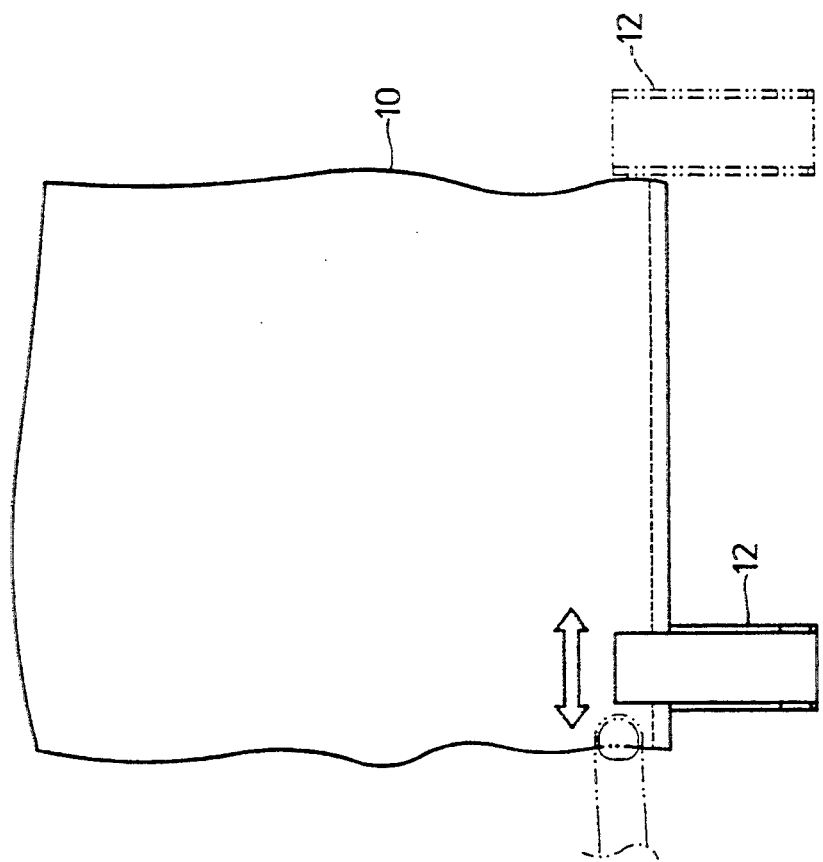
FIG. 9 is a schematic drawing showing the use of a prior art staple type heat sealer in sealing the open side of a polyethylene bag.

Referring to FIG. 8, therein illustrated is an alternate form 3A of the power supply unit 3A. The battery chamber 30 of the power supply unit 3A comprises a rear opening 39 covered with an end cap 9 for loading dry battery cells 4;4'. The end cap 9 has a conductor 90 on the inside. As the end cap 9 is fastened to the battery chamber 30 of the power supply unit 3A, the conductor 90 and the metal contacts 32;33 and the dry battery cells 4;4' form into a closed circuit. This arrangement is designed to replace the aforesaid opening 301 and battery lid 37 for easy loading of the dry battery cells 4;4'.

I claim:

1. An electric heat sealer comprising:
    an elongated, generally pen-shaped housing including a power supply unit and having at one end electric terminal means connected to the power supply unit, the housing including an end portion at said one end of the housing, the housing end portion having an opening and containing an electric heat seal unit including a heat sealing tip projecting from the opening in said end portion and an electric heating element extending across the exterior portion of said heat sealing tip, the electric heating element comprising an electric heating wire, the heat seal unit further including a layer of heat resistant fibers disposed about the tip of the heat seal unit and covering the electric heating wire, the heat seal unit being movable axially within said end portion and including electric contact means movable therewith connected to the electric heating element, the electric contact means on the heat seal unit being arranged to engage the electric terminal means on the housing to complete an electric circuit between the power supply unit and the electric heating element, a spring disposed between the one end of the housing and the heat seal unit, the spring axially biasing the heat seal unit toward the opening in the end portion of the housing a distance sufficient to separate the contact means on the heat seal unit from the terminal means on the housing, axially directed pressure on the projecting tip of the heat seal unit causing sufficient axial movement of the heat seal unit against the bias of the spring to cause the contact means on the heat seal unit to engage the terminal means on the housing to complete the circuit between the power supply unit and the electric heating element on the heat sealing tip, release of the pressure causing axial movement of the heat seal unit under the urging of the spring to cause the contact means and the terminal means to disengage and to break said circuit.

2. An electric heat sealer, as set forth in claim 1, further including a power switch on the housing, the power switch coupling the power supply unit and the terminal means on the housing.

3. An electric heat sealer, as set forth in claim 1, in which the housing has a central longitudinal axis and the opening in the end portion of the housing is coaxial with said axis.

4. An electric heat sealer, as set forth in claim 3, in which the end portion of the housing comprises a socket attached to the one end of the housing, the socket including the opening and having a tapered configuration, the socket having a larger portion adjacent the one end of the housing to which the socket is attached and a smaller portion adjacent the opening in the socket.

5. An electric heat sealer, as set forth in claim 1, further including a protective cap detachably covering the end portion of the housing, the cap including a clip for fastening the heat sealer to an article of clothing.

6. An electric heat sealer, as set forth in claim 1, in which the end portion of the housing includes means for guiding the axial movement of the heat seal unit.

* * * * *